T. L. Pye,

Padlock,

No. 1,063. Reissued Oct. 16, 1860.

Witnesses:

Lemuel W. Serrell

Thos. Geo. Harold

Inventor:

Thos. L. Pye

AM. PHOTO-LITHO. CO. N.Y. (OSBORNE'S PROCESS.)

UNITED STATES PATENT OFFICE.

THOMAS L. PYE, OF NEW YORK, N. Y.

IMPROVEMENT IN LOCKS.

Specification forming part of Letters Patent No. 21,636, dated September 28, 1858; Reissue No. 1,063, dated October 16, 1860.

*To all whom it may concern:*

Be it known that I, THOMAS L. PYE, of the city, county, and State of New York, have invented a new and Improved Lock; and I do hereby declare that the following is a full, clear, and exact description of the same, reference being had to the accompanying drawings, making part of this specification, in which—

Figure 1:
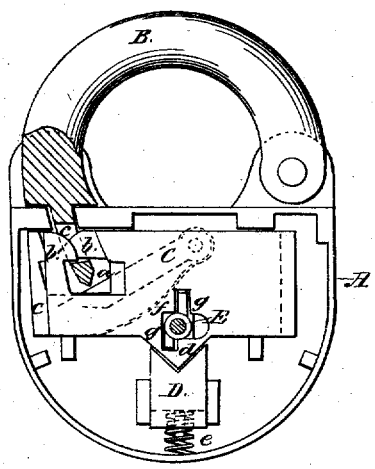
Figure 2:
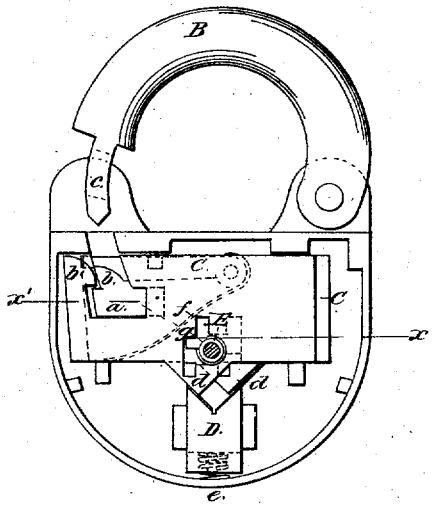
Figure 3:
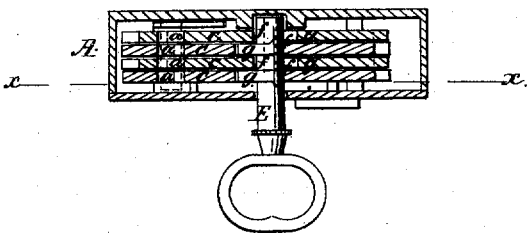

Figures 1 and 2 are internal views of my improvement, the front side of the case being removed, as indicated by the line *x x*, the lock in Fig. 1 being shown in a locked state and in Fig. 2 in an unlocked state. Fig. 3 is a section of the same, taken in the line *x′ x′* of Fig. 2.

Similar letters of reference indicate corresponding parts in the several figures.

The nature of my said invention consists in a series of tumblers moving in reverse directions in combination with a key having bits on two sides, whereby some tumblers are moved in one direction and others in the other to bring the notches or openings to the correct point for receiving or liberating the shackle or stud of the bolt or latch, whereby a very simple and efficient lock is obtained, and one that cannot readily be opened except by the proper key.

The invention is more especially designed for padlocks, but still is applicable to other forms of locks.

To enable those skilled in the art to fully understand and construct my invention, I will proceed to describe it.

A represents the case of a padlock, which may be of the usual form; and B is a shackle, which is also of the usual construction, and applied to the case A in the ordinary way. Within the case A a series of sliding tumblers, C, are placed. These tumblers are each slotted so as to leave an opening, *a*, made through them and an adjoining slot, *b*, the latter extending to the upper edges of the tumblers, so that the sides will form catches *b′*, to work into the eye *c* of the shackle when the latter is in the case and the lock is in a locked state, as seen in Fig. 1. The tumblers are placed one behind the other within the case, and their slots *a b* are made in them at varying distances apart, so that each tumbler will require to be moved to a different distance in order to bring all the slots in line with each other and allow the shackle to be withdrawn from the case. Each tumbler C has a triangular or V-shaped projection, *d*, at its under side, which projection fits in a V-shaped groove in a bar, D, which has a spiral spring, *e*, bearing against its under side, as is clearly shown in Figs. 1 and 2. Each tumbler C has an opening, *f*, made through it to receive the key E, which key has bits *g* projecting from it at opposite sides, said bits being of unequal length, corresponding to the varying positions of the slots *a b* in tumblers C. The bar D retains the tumblers in proper position so that the catches *b′* will be retained in the eye *c* of the shackle. The ends of the catches *b′* are rounded, so that the eye *c*, when pressed into the case A, will lock itself, said eye pressing aside the tumblers as it enters the slots *b*, and the spring-bar D forcing back the tumblers to their original position when the eye *c* is in line with the catches *b′*.

To unlock the lock the key E is inserted in the openings *f* of the tumblers, and as said key is turned its bits *g* move the tumblers C in opposite directions, two moving to the right and two to the left, and the bar D is pressed or moved downward, the projections *d* forcing down the bar, and when the slots *b* are in line the shackle is thrown out from the case. The bar D, by aid of spring *e*, throws the tumblers back to their original position, when the key is withdrawn or is slightly turned back by the hand.

By this improvement one spring, *e*, is made to suffice for all the tumblers, on account of the bar D and the projections *d* on the tumblers C, and the lock is much simplified by this arrangement.

It will be evident that my invention may be adapted to different kinds of locks, as aforesaid, so long as the key with bits on opposite sides is combined with tumblers moving in the reverse direction to liberate the bolt, as set forth.

What I claim, and desire to secure by Letters Patent, is—

2. A series of tumblers provided with openings or notches, into which the shackle or stud of the bolt passes, in combination with a key having bits on opposite sides, by the turning of which said tumblers are moved in reverse directions to bring the notches or openings into line for receiving or liberating the shackle or stud of the bolt, as set forth.

2. A V-shaped sliding bar and spring, combined with said reverse moving tumblers, to restore them to a normal position when the key is not in action, as set forth.

In witness whereof I have hereunto set my signature this 10th day of September, 1860.

THOS. L. PYE.

Witnesses:

THOS. GEO. HAROLD,

LEMUEL W. SERRELL.